UNITED STATES PATENT OFFICE.

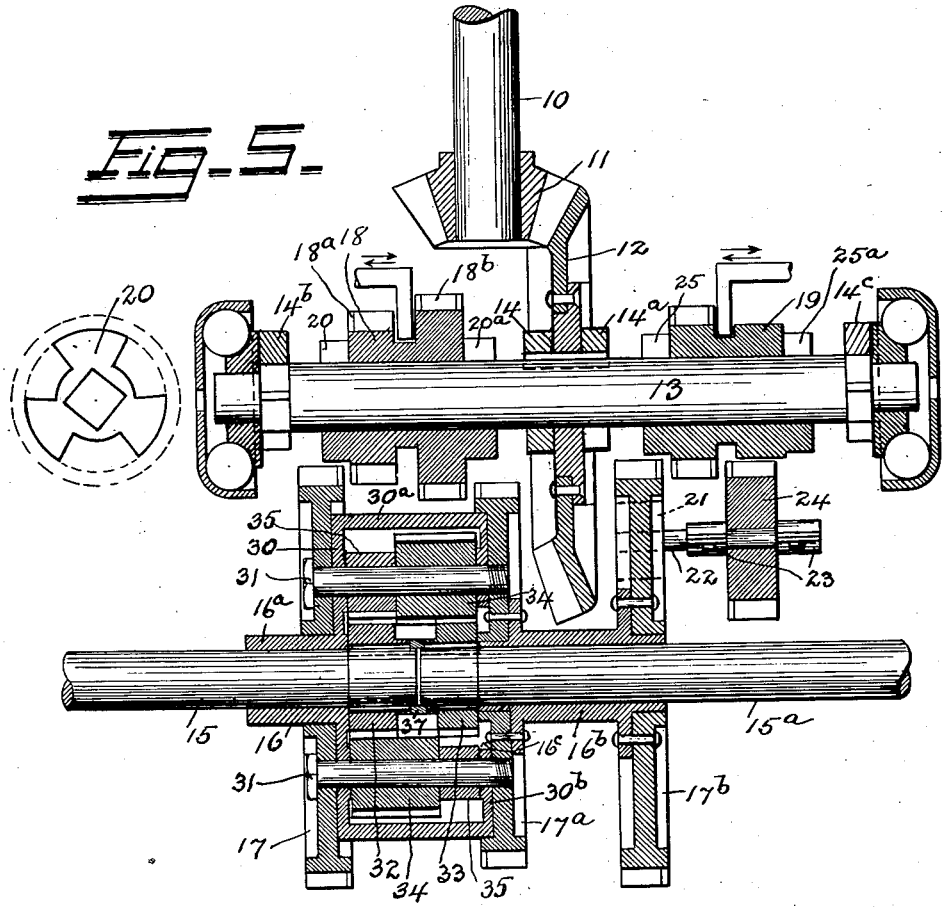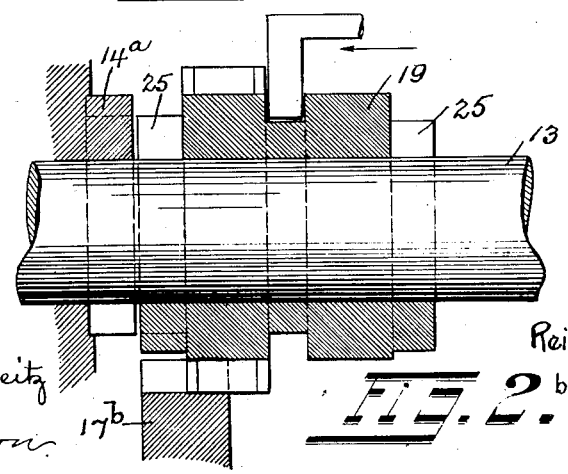

REINHOLD HERMAN, OF CRAFTON, PENNSYLVANIA.

TRANSMISSION MECHANISM.

1,178,010.  Specification of Letters Patent.  Patented Apr. 4, 1916.

Application filed January 9, 1911. Serial No. 601,758.

*To all whom it may concern:*

Be it known that I, REINHOLD HERMAN, a citizen of the United States of America, residing at Crafton, in the county of Allegheny and State of Pennsylvania, have invented certain new and useful Improvements in Transmission Mechanisms, of which the following is a specification.

My invention relates to improvements in transmission mechanism, and has particular relation to mechanism for operatively connecting a drive shaft to a driven shaft through speed-changing mechanism.

The present invention is more particularly designed for use in connection with a casing or supporting device disclosed in my companion application filed January 9, 1911, Serial No. 601,754, but the structure disclosed herein is such as will permit its use independently of such casing and in capacities where change-speed mechanism as a part of a transmitting mechanism is employed.

Among the objects of the present invention are to be found the following: (1) The provision of a differential mechanism carried by the driven shaft, which mechanism includes a carrier on which the various driven gears for imparting motion to the driven shaft are secured; (2) the provision of a plurality of driven gears carried by the driven shaft with a selecting drive gear loosely mounted on a constantly driven shaft and adapted to be clutched thereto, when the drive gear has been moved into operative relation to the selected driven gear; (3) the provision of a constantly driven shaft carrying a coupling member and also carrying a loosely mounted drive gear adapted to be shifted into and out of engagement with the clutching member, and a driven gear mounted on a driven shaft and fixedly held against axial movement, said driven gear and clutch member being relatively positioned to permit an operative engagement of the drive and driven gears before clutch-engagement of the constantly-driven shaft and the drive gear is had; (4) the provision of drive and driven gear engagement by relative axial movement and so formed and arranged as to provide for engagement without possibility of stripping the teeth, obviating danger of operators unfamiliar with transmission mechanisms injuring same in manipulation thereof.

To these and other ends, the nature of which will be readily understood as the invention is hereinafter disclosed, said invention consists in the improved construction and combination of parts hereinafter fully described, illustrated in the accompanying drawings, and particularly pointed out in the appended claims.

Figure 3:
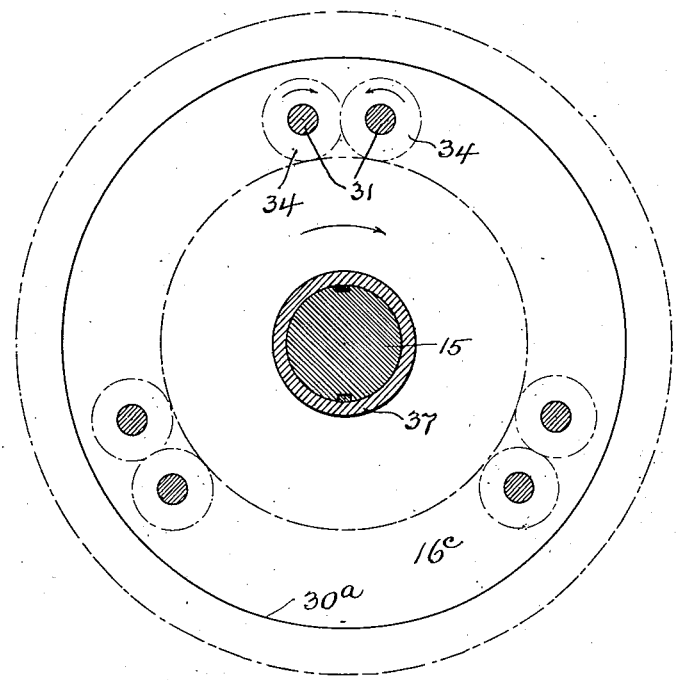
Figure 4:
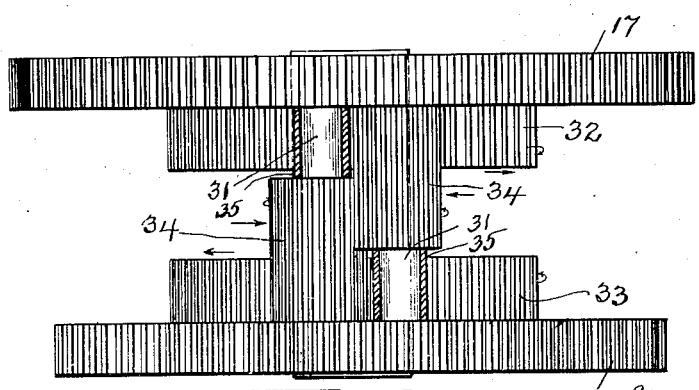

In the drawings, in which similar reference characters indicate similar parts in each of the views, Figure 1 is a sectional view taken centrally through the mechanism and showing the shiftable gears in a neutral position. Fig. 2 is an enlarged detail view of one of the shiftable members, its shaft and coupling or clutch-member, and the gear driven by said shiftable drive gear, the gears being shown in position just prior to coupling of the drive gear with its shaft. Fig. 3 is a sectional view taken on the line 3—3 of Fig. 1. Fig. 4 is a sectional view taken through the differential mechanism on the line 4—4 of Fig. 1. Fig. 5 is a view somewhat diagrammatic, showing the tooth arrangement of the gears.

In the drawings, 10 designates the drive shaft, having a drive pinion 11 secured thereon, said pinion being in constant mesh with a bevel gear 12 secured to a shaft 13 mounted in suitable bearings, said shaft 13 being constantly driven from the drive shaft through the pinion 11 and gear 12. The shaft 13 is provided on opposite sides of the gear 12 with coupling or clutch members 14, and 14$^a$, said members each being mounted to rotate with the shaft and having an end configuration adapted to coöperate with complemental members carried by shiftable gears presently described. The shaft 13 is also provided adjacent its ends with clutch members 14$^b$ and 14$^c$ also arranged with an end configuration complemental to coupling faces or members carried by the shiftable gears referred to, the coupling ends of the members 14 and 14$^b$, and 14$^a$ and 14$^c$, facing each other and spaced apart a distance sufficient to provide for the shifting movements of the shiftable drive gears. 15 and 15$^a$ designate the sections of the driven shaft and on which is mounted a gear carrier 16, said carrier being formed to support the change-speed driven gears 17, 17$^a$ and 17$^b$, said gears being of different diameter to provide the speed variations, it being understood that the driving of either of said gears causes the driven shaft to be rotated.

Loosely mounted on the shaft 13 are the drive gears 18 and 19, the former being provided with two gear faces 18$^a$ and 18$^b$ adapted to coöperate respectively with the gears 17 and 17$^a$. The gear 18 is provided on its opposite ends with coupling or clutch members 20 and 20$^a$, the former being adapted to coöperate with the clutch member 14$^b$, and the latter with clutch member 14, sufficient play being provided between the complemental clutch-members to permit the gear 18 to occupy a neutral position out of engagement with the two driven gears with which it is adapted to coöperate, and to move axially a distance sufficient to provide a material overlapping of the teeth of coöperating gear-faces prior to the engagement of the complemental coupling-members.

21 designates a gear in permanent mesh with the gear 17$^b$, said gear 21 being carried by a stub shaft 22 suitably-supported in bearings 23, said shaft also carrying a driven gear 24 spaced from the gear 21 a distance sufficient to permit the gear 19 to have a neutral position therebetween, the paths of movement of the gear-faces of gears 17$^b$ and 24 being so arranged as to permit the gear 19 to be moved into engagement with either of said gears. The gear 19 is also provided on opposite ends with clutch-members 25, and 25$^a$ complemental to and adapted to engage respectively the clutch-members 14$^a$ and 14$^c$ on the shaft 13, said complemental members also being spaced apart a distance sufficient to provide the play hereinbefore referred to in connection with the clutch members of the gear 18, and for the same purpose.

As shown in the drawings, the gear teeth of the gears adapted to be engaged during the axial movements of the shifting drive gears have their ends which are adapted to be brought into engagement beveled, chamfered or otherwise formed, to decrease the side face of a tooth and increase the distance between the teeth on the plane of such side face, thereby permitting of a ready entrance of the teeth to be engaged.

By this construction and arrangement of parts it will be readily seen that owing to the fact that the shifting gears 18 and 19 are loosely mounted on the constantly driven shaft 13, the movement of the latter will not positively impart a rotary movement to the gears while the latter are shifted within the limits of their movements when uncoupled; therefore, the shifting of the gears 18 and 19, when the driven shaft is at rest, causes the opposing faces of the drive and driven gears to readily enter and engage, the tendency of the drive gear to rotate with the shaft providing any slight movement of the drive gear to insure entrance of the teeth to be engaged; and this engagement is also readily had when the driven shaft is in motion, the driven gears while rotating, passing by the opposing teeth of the drive gear to be engaged and permitting the latter to make entrance therein and be carried thereby irrespective of the constant movement of the shaft on which the drive gears are mounted. As will be readily understood, the movement of the shifting drive gears axially can be had without engagement of the clutching-members, and to a distance sufficient to provide an overlapping of teeth to any desired extent, preferably an overlap of approximately half of the length of the tooth; obviously an overlap of this extent is sufficient to prevent any liability of the stripping of teeth due to the fact that the gear has assumed its relative speed with relation to the engaged gear before the clutch becomes effective. When the drive gear is shifted in the opposite direction, the clutch is uncoupled before the gear teeth are wholly disengaged, so that the drive gear is free to be moved to neutral position without being subjected to the load of the drive shaft 13.

The differential mechanism herein disclosed is of a particular construction although of the general type of differential gearing. This differential mechanism is preferably formed as follows:—The gear carrier 16 is formed in two parts indicated as 16$^a$ and 16$^b$, the parts 16$^a$ having a radial flange 30 extending from the hub of the part, a circular band-like part 30$^a$ extending concentric with the axis of the shaft and is of a length sufficient to form a housing for the several gears which act to provide the differential movement, the opposite end of the part 30$^a$ having an inwardly-extending flange 30$^b$ of a radial length less than the similar length of the flange 30, the parts 30, 30$^a$ and 30$^b$ forming a housing for the differential gears. The flanges 30 and 30$^b$ are provided with openings at proper intervals for the passage of bolts 31, each of which act as a support for a differential gear, the bolts 31 being equal in number to the number of rolling gears within the housing, said bolts 31 also projecting through and connecting the gear 17 to the flange 30 and gear 17$^a$ to the flange 30$^b$, thus connecting said driven gears to the housing and to the supports for rolling gears. As shown in Fig. 1, the gear 17$^a$ has a hub-like portion extending inwardly into the space within the flange 30$^b$, said hub-like portion being mounted on the part 16$^b$ of the gear-carrier, said part being secured to said gear 17$^a$ by rivets or other suitable fastening device.

Mounted on the driven shaft within the housing are gears 32 and 33, said gears being mounted respectively on the separate parts of the divided shaft. Said gears 32 and 33 are preferably keyed to their respective shafts in the manner presently described, and are preferably formed so as to provide an annular space therebetween on the plane of the gear faces approximately equal to about one-third of the distance between the flanges 30 and 30$^b$. The rolling gears, indicated as 34 are, as heretofore pointed out, mounted on the bolts 31, each gear having an approximate active length equivalent to the width of a fixed gear 32 or 33 and the space therebetween, the remaining distance between the end of the gear and the opposite flange of the housing being provided by a collar 35.

The gears 34 are secured in position in pairs, one gear of each pair projecting from the flange 30, while the other gear of the pair extends from the flange 30$^b$, thereby providing an overlap of the gears of the pair equal to the width of the space between the gears 32 and 33, this overlap providing the permanent engagement between the gears of each pair. As will be readily understood, this particular arrangement causes one gear of each pair to engage with the fixed gear 32, while the other gear of the pair engages the gear 33, the gears of each pair engaging each other, these various engagements and the particular mounting of the supports for the rolling gears (the bolts 31) providing for the required movements of the gears to produce the differential action, it being clear that, by reason of the particular manner in which the parts are secured together, the flanges 30 and 30$^b$, the part 30$^a$, the gear 17$^a$, and the part 16$^a$ act to form a positive connection between the two sections of the driven shaft.

As will be seen, the gears 32 and 33 are keyed to the sections of the driven shaft preferably on opposite sides diametrically of the shaft, the keys being of a length less than the distance between the opposing faces of the gear carrier, thereby providing an annular space therebetween substantially corresponding to the distance between the shaft sections; the keys are also formed with cutout portions which are adapted to receive an annular ring 37 which loosely fits the space between the gears 32 and 33, said ring 37 thus acting to retain the gears spaced apart, and at the same time preventing longitudinal movement of the keys, this latter preventing any liability of the keys passing into an overlapping relation, in operation, and avoiding any liability of damaging the structure by the overlapping of keys.

In assembling the differential mechanism, the gear 17 is placed on the carrier 16, and gears 34 are then placed inside of carrier 16 and bolts 31 inserted through openings in gears 17 and carrier 16 and also through openings in gears 34 holding the same in position. Gears 32 and 33 are then placed on their respective sections of the driven shaft, and section 15 to which gear 32 is attached is entered through opening 16$^c$ and through opening in carrier 16 until gear 32 meshes with one half of the gears 34; then ring 37 is placed in position on section 15. Shaft 15$^a$ carrying gear 33 is then placed through the opening of the part 16$^b$ of the carrier which also carries gear 17$^a$ and gear 17$^b$. When this assembly is completed then gear 33 carried by section 15$^a$ is entered through the opening 16$^c$, and then gear 33 will mesh with the other half of gears 34. Then bolts 31 are screwed into the openings provided therefor in gear 17$^a$ thereby securing the two halves of the carrier into one unit.

This construction of differential mechanism not only provides for an efficient operation, but the construction is such as to provide for a ready assemblage of parts, a durable construction not readily damaged, and a structure which can be easily taken down when necessary in such a manner as to render mistakes in assembling practically impossible.

I desire to call attention to the fact that in this system of shifting gears, it is made possible at all times to first engage the gear to be driven without having to contend with any load other than the weight of the shifting gear itself thereby providing for engagement between the gears without any friction or shock, the shock taking place after the engagement of the gears when the clutch movement is being completed and necessarily must be distributed throughout the whole transmission mechanism. This particular advantage is additionally derived from the fact that the intermediate shaft 13 is driven at decreased speed relative to the drive shaft, the gear connections between these shafts being of such ratio as to permit the shaft 10, to rotate at high speed without causing the shaft 13 to run at excessive speed. This particular arrangement becomes of especial advantage in changing speed or "picking-up" after "drifting", the axle causing the gears thereon to be rotating at a speed which more nearly approximates the speed of the shaft 13 than that of the shaft 10. As there is a tendency of the loosely mounted gears to rotate in the direction of rotation of the shaft 13, it will be readily seen that the relative speed of the gears to be engaged is brought into approximation, enabling the engaging to be provided with ease and without any liability of stripping the gears, the slight difference in relative movement tending to avoid "clashing" especially when the teeth are pointed as shown.

While I have herein disclosed one type of structure embodying the general idea contemplated by the present invention, it will be readily understood that the same may be changed and modified without departing from the idea; I therefore desire it to be understood that I reserve the right to make any and all such changes and modifications as may be required to meet conditions in use, so far as they may fall within the spirit and scope of the invention as expressed in the following claims.

Having thus described my invention, what I claim as new is:

1. In change speed mechanism, a drive member, a member driven constantly by said drive member at a relatively reduced speed, meshing gears on the drive and driven members, a second driven member, a gear thereon, said driven members extending in parallelism and the drive member having its axis at right angles to the axes of the driven members, a shiftable gear mounted on the constantly driven member, said shiftable gear being movable to be driven by or run free upon said constantly driven member at will, said shiftable gear being movable to engage the gear on said second driven member while the shiftable gear is free to rotate on its member, the shiftable gear having clutch faces and the gear on the first mentioned driven member having clutch faces, bearings supporting the driven member, and a clutch member engaged directly against one member of the bearings and engageable by one of the faces of the shiftable gear.

2. In change speed mechanism, a drive member, a member driven constantly by said drive member at a relatively reduced speed, meshing gears on the drive and driven members, a second driven member, a gear thereon, said driven members extending in parallelism and the drive member having its axis at right angles to the axes of the driven members, a shiftable gear mounted on the constantly driven member, said shiftable gear being movable to be driven by or run free upon said constantly driven member at will, said shiftable gear being movable to engage the gear on said second driven member while the shiftable gear is free to rotate on its member, the shiftable gear having clutch faces and the gear on the first mentioned driven member having clutch faces, bearings supporting the driven member, and a clutch member engaged directly against one member of the bearings and engageable by one of the faces of the shiftable gear, the clutching faces being engageable only when the gears have passed into engagement.

3. In change speed mechanism, a drive member, a member driven constantly by said drive member at a relatively reduced speed, a driven member, a gear thereon, said driven members extending in parallelism and the drive member having its axis at right angles to the axes of the driven members, a shiftable gear mounted on the constantly driven member, said shiftable gear being movable to be driven by or run free upon said constantly driven member at will, said shiftable gear being movable to engage the driven member gear while the shiftable gear is free to rotate on its member, said shiftable gear and the member on which it is supported carrying complemental clutching-faces engageable only after the gears have passed into engagement, the clutching-faces passing into contact prior to the completion of the movement of the gear to its normal drive position, said clutching faces of the shiftable gear being formed integral therewith and the complementary faces being supported directly against a bearing member and the gearing on the driven member.

In testimony whereof I affix my signature in presence of two witnesses.

REINHOLD HERMAN.

Witnesses:
A. M. WILSON,
HORACE G. SEITZ.